US007376714B1

(12) United States Patent  
Gerken

(10) Patent No.: US 7,376,714 B1  
(45) Date of Patent: May 20, 2008

(54) SYSTEM AND METHOD FOR SELECTIVELY ACQUIRING AND TARGETING ONLINE ADVERTISING BASED ON USER IP ADDRESS

(76) Inventor: David A. Gerken, 13955 W. Tahiti Way, #368, Marina Del Rey, CA (US) 90292

( * ) Notice: Subject to any disclaimer, the term of this patent is extended or adjusted under 35 U.S.C. 154(b) by 853 days.

(21) Appl. No.: 10/817,593

(22) Filed: Apr. 1, 2004

Related U.S. Application Data

(60) Provisional application No. 60/459,923, filed on Apr. 2, 2003.

(51) Int. Cl.  
*G06F 15/173* (2006.01)

(52) U.S. Cl. ..................................... 709/219

(58) Field of Classification Search ................ 709/219, 709/223, 227; 705/14  
See application file for complete search history.

(56) References Cited

U.S. PATENT DOCUMENTS

| | | | | |
|---|---|---|---|---|
| 5,948,061 | A * | 9/1999 | Merriman et al. | 709/219 |
| 6,151,631 | A | 11/2000 | Ansell et al. | |
| 6,182,050 | B1 * | 1/2001 | Ballard | 705/14 |
| 6,339,761 | B1 * | 1/2002 | Cottingham | 705/14 |
| 6,487,538 | B1 * | 11/2002 | Gupta et al. | 705/14 |
| 6,665,715 | B1 * | 12/2003 | Houri | 709/223 |
| 2001/0039210 | A1 | 11/2001 | ST-Denis | |
| 2002/0010626 | A1 | 1/2002 | Agmoni | |
| 2002/0016831 | A1 | 2/2002 | Peled et al. | |
| 2002/0120629 | A1 | 8/2002 | Leonard | |
| 2003/0036949 | A1 | 2/2003 | Kaddeche et al. | |

* cited by examiner

*Primary Examiner*—David Y. Eng  
(74) *Attorney, Agent, or Firm*—Michael Blaine Brooks, P.C.; Michael B. Brooks

(57) ABSTRACT

The present invention provides a system and method for selectively acquiring and targeting online advertising inventory based on users' Internet Protocol (IP) addresses. In one aspect of the invention, Web publishers are made aware of IP addresses of interest, determined by matching attributes of current Internet users for whom IP addresses are known and targeting attributes of ad campaigns. Then, for each site visitor from one of said IP addresses, publishers choose whether to supply ad inventory to fulfill the immediate demand. Another aspect of the invention provides for targeting of online ads based on updated user IP addresses and some associated personal data provided by ISPs. An embodiment of the invention provides for a localized online advertising network in which ad inventory is selectively acquired from web sites, as required to fulfill immediate advertiser demand, and targeted by user zip code, as registered with users' ISPs.

25 Claims, 4 Drawing Sheets

SYSTEM AND METHOD FOR SELECTIVELY ACQUIRING AND TARGETING ONLINE ADVERTISING BASED ON USER IP ADDRESS

CROSS-REFERENCE TO RELATED APPLICATION

This application claims the benefit of U.S. Provisional Application No. 60/459,923, entitled "System and Method for Selectively Acquiring and Targeting Online Advertising Based on User IP Address," filed Apr. 2, 2003, the contents of which are hereby incorporated by reference herein for all purposes.

BACKGROUND

1. Field of the Invention

The present invention relates generally to online advertising systems and methods, and more particularly to systems and methods enabling the acquisition and targeting of online advertising inventory.

2. Description of the State of the Art

The targeting of Internet advertising and content based on the personal attributes of individual Internet users has been a key goal of web publishers and advertisers since the emergence of the Internet as a significant consumer medium. Improved targeting of ads and content provides a more relevant online experience for users and helps to maximize the effectiveness of advertisers' online campaigns.

The degree to which online advertising and content can be targeted is driven in part by the amount of information available to advertisers and web publishers about individual web site visitors. Some of the more common types of information used to target ads and content are: (a) web page context, whereby advertisements are selected and displayed based on their relevance to the context of the web page, such as when an ad for a stock brokerage firm is displayed on the personal finance page of a popular web portal; (b) user-provided information, whereby advertisements and content are selected, or created, and displayed based on information provided by the site visitor during the current or previous site visits such as the terms of his search query, his zip code as entered to obtain local information, or his user registration information, often including age, gender and other personal data; and (c) derived user information, whereby advertisements and content are selected, or created, and displayed based on information derived about a user, without his direct involvement, such as his approximate city of origin, derived using various methods of correlating user Internet Protocol (IP) addresses with approximate geographic locations, or his connection speed.

Existing methods of advertising and content targeting, however, can be limited in scope and accuracy. For example, most sites do not ask users to register, and many of those that do are successful in getting only a small share of users to do so.

Also, popular methods of assessing the geographic location of users based on their IP addresses are limited in accuracy, particularly at the local level. Some existing methods attempt to derive general user location by correlating user IP addresses with registration data from public databases of registered IP addresses and data from various network service companies with equipment broadly dispersed across the Internet. Such methods, however, while reported to be up to 99% accurate in determining users' country of origin, are generally significantly less accurate at the metropolital statistical area (MSA) level and completely ineffective at the zip code level. These methods by their very nature focus on deriving locations of network access nodes rather than end users, which can require quite different approaches. Limitations of such methods are inherent in the nature of Internet Service Provider (ISP) network architectures, where traffic can be consolidated at nodes quite distant from end users and where publicly registered blocks of IP addresses may be allocated by ISPs across broad geographic areas.

While some companies possess potentially valuable profile information for individual Internet users, privacy concerns often restrict their ability to share this information with web publishers and advertisers that might use it to target web advertising or content. In particular, ISPs possess mailing addresses and other information about their subscribers; however, company and industry privacy policies and standards generally prohibit or discourage them from directly sharing such "individually identifiable information" with other companies. ISPs therefore typically use such subscriber data to target ads only on their own content pages.

Meanwhile, most web sites have significant excess ad inventory. Some estimates suggest that over 70% of banner ad inventory goes unsold, generally filled with "house" ads promoting the web publishers' own offerings. Likewise, it has been estimated that only 30-40% of search queries on popular search engines are accompanied by "paid placement" results, in which web links of designated paid advertisers are included with the search results.

Some web publishers choose to sell large allocations of their excess ad inventory to online advertising networks—generally at substantial discounts to their published "rate card" rates—which aggregate inventory from numerous web sites and resell it to advertisers in various cross-network packages. However, this practice is often shunned by the largest of web sites because: (a) the extreme discounting can impact pricing of their premium ad inventory; (b) the allocated inventory can often go unsold or be resold to undesirable advertisers attracted by clearinghouse prices, and/or (c) the advertisements appearing in the provided ad slots are generally untargeted by nature and can thus be perceived as more detrimental to the user experience than can be justified by the additional revenue.

Illustrated in FIG. 1 is a general online advertising network system 100, which typically has an Internet user level 140, a participating web sites level 130, an online ad network provider level 120 and an advertisers level 110. The general online advertising network system 100 typically has the advertisers of the advertiser level 110 providing ad campaigns 111 to the one or more servers 121 of the online ad network provider level 120. The users 141-143 make page requests to, and receive downloads from, one or more servers 131-133 of the participating web sites. Acting on ad tags served by participating web sites, users' browsers then make ad requests to, and receive ads from, the one or more servers 121 of the online ad network provider. General online advertising networks often negotiate blocks of ad inventory from participating web sites in advance, without precise knowledge of, or flexibility to adjust to, immediate demand for that inventory from their advertiser clients. As such, general online advertising networks are often provided with ad inventory that either cannot be filled by quality advertisers or must be sold at significantly discounted prices. As a result, many of the most popular web sites choose not to participate in online advertising networks.

Consequently, there is a need in the art for a method whereby IP addresses of individual current Internet users can be reliably correlated with known attributes of those users and then used to target online advertising across the web, thereby providing a more universal means of online ad targeting. There is a further need in the art for a method whereby an online ad network or third-party ad server can selectively acquire ad inventory from web sites for only those site visitors for whom immediate advertiser demand exists. There is also a further need in the art for a method whereby the immediate demand for ad inventory for specific site visitors can be communicated to web sites by an ad network or third party ad server without explicitly sharing information about those users.

SUMMARY OF INVENTION

The present invention is a system and method for selectively acquiring and targeting online advertising based on user IP addresses. The present invention, in its several embodiments, provides a method whereby IP addresses of current Internet users, provided by ISPs, are correlated with attributes of those users—e.g. registered zip code, city of origin, Internet connection type, household income range—drawn from any one or combination of data sources, including the ISPs' own account management systems. Through a web publisher, online advertising network, third-party ad server or their agents, advertisers book online ad campaigns targeting Internet users sharing one or more of these known attributes. In one embodiment of the invention, advertising entities book campaigns targeting users with specific zip codes, as registered with the users' ISPs. Web publishers receive, or are otherwise provided awareness of, the IP addresses of current Internet users for whom ad inventory is currently required, preferably determined by comparing the known personal attributes of current Internet users for whom IP addresses are known and the targeting attributes of current ad campaigns. The online ad network or third-party ad server may communicate said IP addresses either directly or by responding to individual requests from web sites for confirmation as to whether a particular IP address is among those of interest. In some embodiments of the invention, one or more numerical values are provided with each IP address or confirmation indicating the compensation to be provided to the web site for ad inventory of specified formats contributed for that IP address. At their discretion, web sites provide ad inventory to the online ad network or third-party ad server, by including an appropriate "ad tag" in web pages served to site visitors, in instances where a visitor's IP address is among those thus indicated to be of interest to the ad network or third-party ad server. The online ad network or third-party ad server, upon receiving a resulting ad request from an IP address of one of those users, selects, or creates, and delivers an ad targeted to that user based on one or more of the known attributes of that user.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF INVENTION

Figure 1:
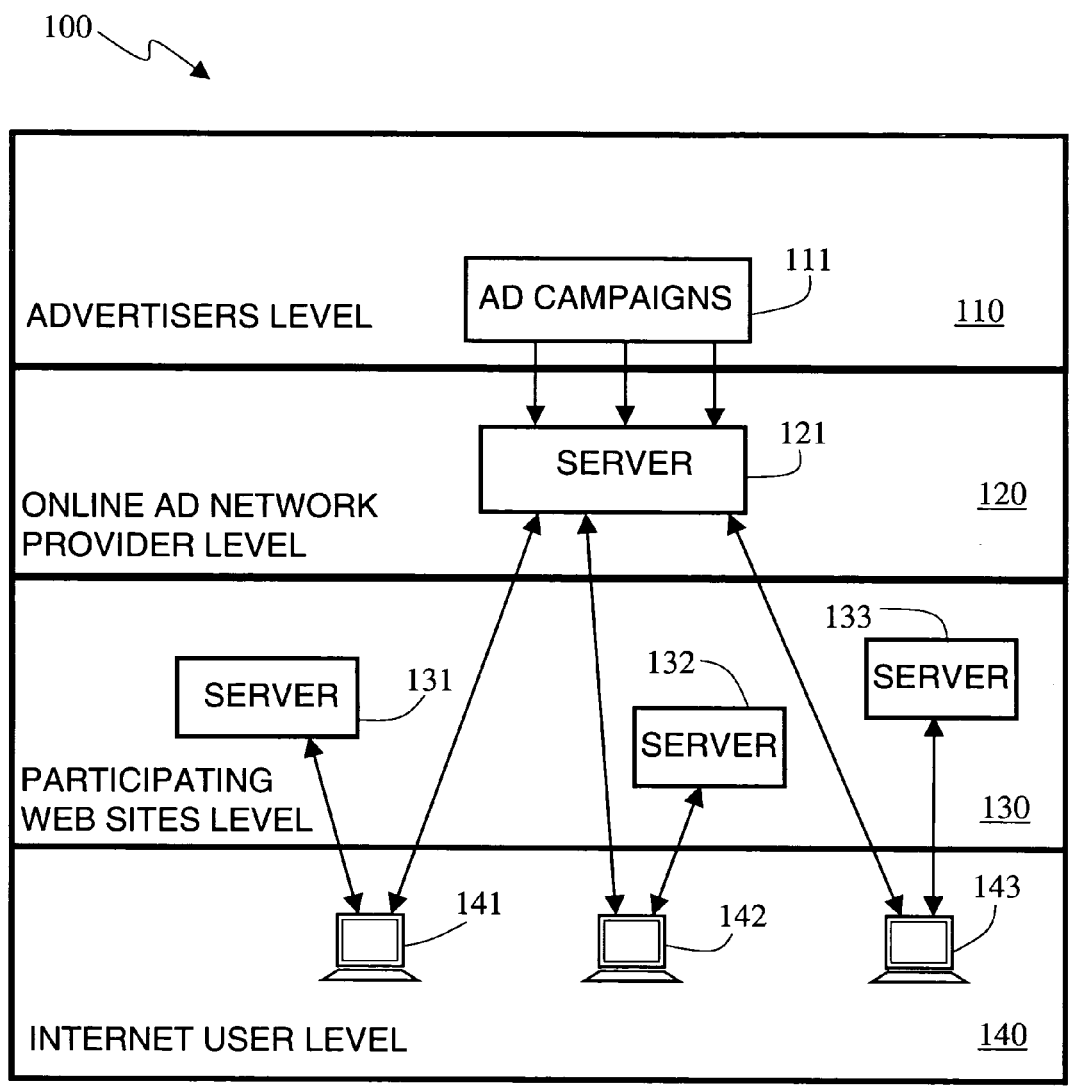
FIG. 1 illustrates an embodiment of a general online advertising network.

Throughout this disclosure: (a) a publisher or web publisher refers to a publisher of web sites; (b) online advertising inventory refers to advertising "slots", or space, typically within a web page, where the space may be of any format—e.g. banner, button, skyscraper, text, paid search result—available to be filled with advertisements; (c) a third-party ad server refers to an entity providing ad-serving and related functions on behalf of individual web publishers; (d) an online advertising network refers to an entity that aggregates online ad inventory from numerous web sites—i.e. the advertising network—and resells it as ad packages spanning all or groups of those web sites; (e) display advertisement refers to an advertisement, including banner ads, typically within a web page, that includes graphical elements; (f) text link refers to text, typically a hypertext line promoting a paid advertiser or its products, that links to another web page, generally a relevant page from that advertiser's web site; (g) paid search result refers to a paid response to a user's search engine query, provided by an advertiser and generally designated as such and of some relevance to the user's query; and (h) personal profile data refers to any information describing individual Internet users, including, but not limited to, personal information such as mailing address and phone number as well as demographic and psychographic data.

The invention, in its several embodiments, includes a system, apparatus and method for enabling the selective acquisition and targeting of online advertising inventory based on Internet users' IP addresses. A preferred embodiment of the invention provides for an online advertising network that enables zip code-targeted advertising, wherein ad inventory is selectively acquired from web sites only as needed to fulfill immediate advertiser demand and then filled with ads targeted to users' zip codes, as registered with the users' ISPs. Disclosed by example are specific implementations for purposes of illustration and not for purposes of limitation where a person skilled in the relevant art will recognize that other components and configurations may be used interchangeably without parting from the spirit and scope of the invention.

A preferred method for targeting Internet advertising disclosed herein includes the steps of: (a) obtaining IP addresses of current Internet users from Internet Service Providers; (b) obtaining corresponding personal profile data for said Internet users from said Internet Service Providers or other sources; (c) correlating said IP addresses of the Internet users with said personal profile data for the users; (d) on receiving an advertisement request from one of said Internet users' browsers, as determined from the user's IP address, selecting, customizing, preparing or otherwise generating or creating an ad based, in whole or in part, on the personal profile data of the user then associated with that IP address; and (e) transmitting the ad to the user's browser.

Preferably, because users' IP addresses may change from session to session or otherwise, the IP addresses and said personal profile data are continuously, continually or periodically updated. Also preferably, the personal profile data includes user zip codes as registered with, or otherwise provided by, said users' Internet Service Providers. Preferably, the participating ISPs correlate said IP addresses and said personal profile data. In other embodiments, component data, such as user ID/billing zip code pairs and user ID/IP address pairs, as might be provided from ISP's account management systems and authentication servers, respectively, are received by the ad network or third-party ad server from participating ISPs and correlated by the receiving entity to derive IP address/user attribute vectors.

The advertisement to be provided to the user may be a banner ad, a display ad of a size other than a banner ad, or a display ad made up of or including one or more text links. The advertisement may itself be a text link or paid search result. In some embodiments, the selection or customization of the advertisement is based on the user's personal profile data together with additional data provided in the user's browser request. This additional data, as may be appended to ad tags by web publishers to facilitate ad targeting by third-party ad servers or ad networks, may include all or part of a said user's search query or the type or category of content associated with the web page in which the ad will appear.

The method for selectively acquiring online advertising inventory from web publishers includes the steps of: (a) identifying IP addresses of current Internet users for which one or more known user attributes matches a targeting attribute of at least one current advertising campaign; (b) providing awareness of said IP addresses to a web publisher; and (c) arranging for said web publisher to supply ad inventory to the acquiring entity, by including an appropriate ad tag in web pages served to visitors of said publisher's web site, in instances where said visitors are from one of said IP addresses. Preferably, the acquiring entity is an online advertising network or a third-party ad server. In some embodiments, one or more numerical values are associated with each said IP address indicating to said web publishers the compensation offered to said web publishers for ad inventory of specific formats contributed for that IP address. Preferably, awareness is provided, or otherwise accomplished, by transmitting said IP addresses or updates to said IP addresses to said web publishers. Preferably, said IP addresses are updated continuously or continually. In some embodiments, the awareness is provided, or otherwise accomplished, by enabling said web publisher to request confirmation as to whether an IP address provided by it is among said IP addresses.

The IP addresses of current Internet users and the zip codes of those users, as registered with users' ISPs, are preferably obtained from ISPs. These data pairs may be provided by ISPs directly, or ISPs may provide component data, such as user ID/billing zip code pairs and user ID/IP address pairs, which the acquiring entity then correlates to derive IP address/zip code pairs. The resulting IP address/zip code pairs provide a basis for ad targeting by the online ad network. These IP address/zip code pairs, or component data used to derive such pairs, are continually updated to reflect changes in the underlying data, such as can occur when a user logs on to or off of their Internet service or when a user's IP address is dynamically changed during an online session.

In one or more embodiments of the invention, user IP addresses are matched with other personal profile data for those users, obtained from ISPs or other sources, and used to provide ad targeting based on other user attributes separately or in combination where examples of such attributes include household income range, marital status or ethnicity. In addition, in some embodiments of the invention, ad targeting is based on one or more of the known user attributes in combination with data provided in the user's browser request, which may include, as an option, parts or all of a user's search query or the type or category of content associated with the web page in which the ad will appear or combinations of both.

Another aspect of the invention, in its preferred embodiment, enables the selective acquisition of online ad inventory from web sites. The present invention, in its several embodiments, addresses the lack of flexibility to adjust to real-time demand for inventory by providing a mechanism whereby web sites can supply ad inventory to an online ad network or third party ad server in only the select instances where immediate demand exists for such inventory. This mechanism is particularly important for an online ad network providing zip code targeting, as at any given moment there may be many zip codes for which no ad campaigns are currently running. This is achieved by providing web sites with continually, or nearly continuously, updated awareness of the IP addresses of current Internet users for which inventory is currently required, as determined based on the known attributes of those users and the targeting attributes of current ad campaigns. Web publishers then, for each site visitor with an IP address thus indicated to be of interest to the ad network, choose whether to supply ad inventory to fulfill the immediate demand by including an appropriate ad tag in one or more of the web pages served to the visitor. This notification of demand for inventory is achieved without the explicit sharing of user data between the ad network requiring the ad inventory and the web sites providing it.

Figure 2:
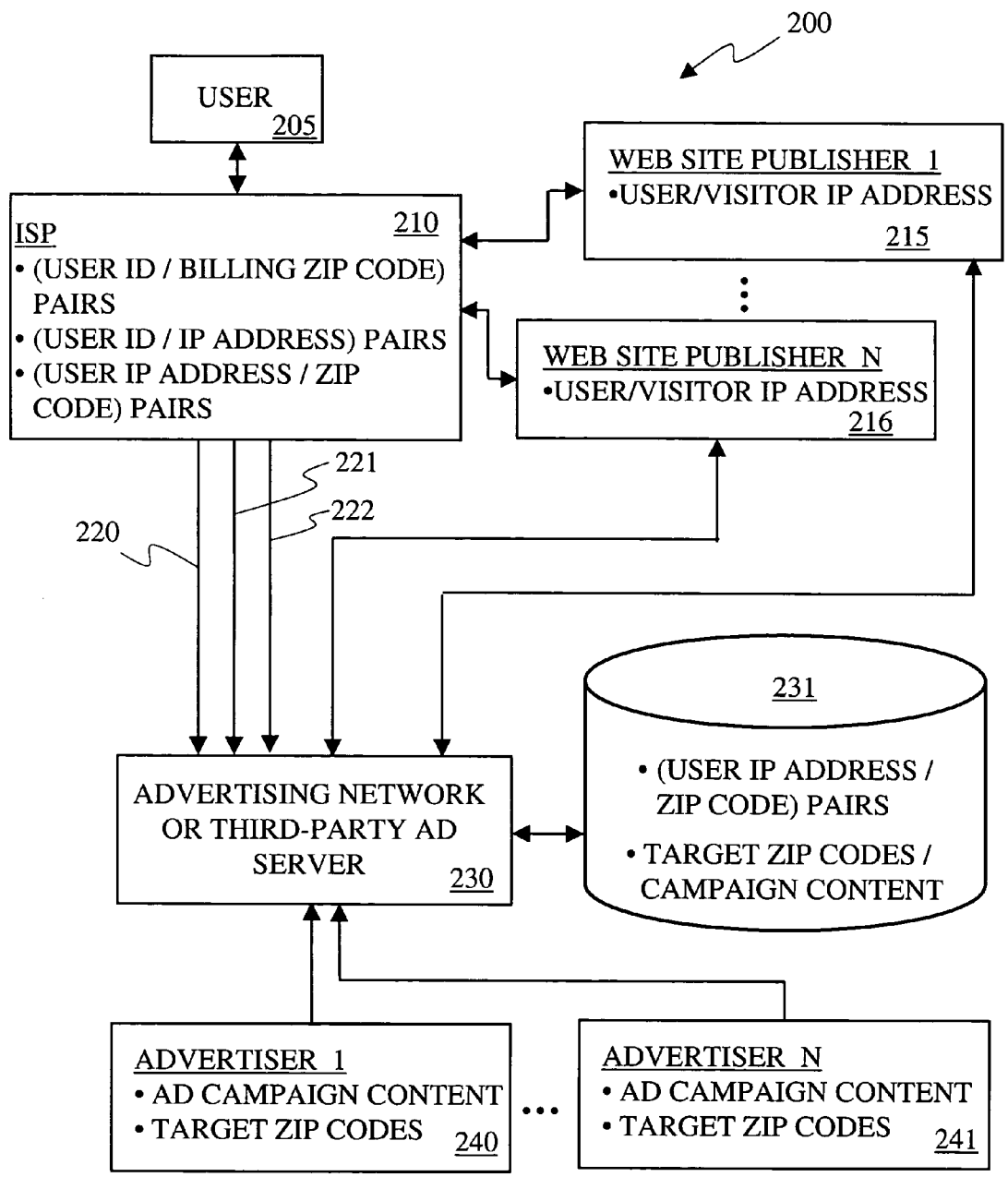
FIG. 2 illustrates select information flows in one embodiment of the invention enabling targeting by user zip code.

Select data flows associated with this means of demand notification are illustrated in FIG. 2 where the method 200 exploits relationships between an IP address and the attributes of the user currently associated with that IP address, such as zip code. In this example, the advertisers 240-241 provide target zip codes and campaign content intended for available web pages viewed by visitors associated with each target zip code. For example, a first advertiser provides campaign content and the target zip codes 91202, 91203, 91204 and 91205 to an ad network or third party server 230. A second advertiser provides campaign content and the target zip code 91203 to the ad network or third party server. A third advertiser provides campaign content and the target zip codes 91207, 91208 and 91209 to the ad network or third party server. A fourth advertiser provides campaign content and the target zip code 91211. Also as shown in FIG. 2, the IP address/zip code pairs 220 of each current Internet user 205 are provided to the ad network or third-party ad server 230 by the participating ISP 210 directly. For example, an ISP provides the IP-address/zip code pairs for current Internet users: 254.59.231.114/91200; 254.59.230.14/91203; 254.59.231.173/91211; and 254.59.230.138/91227. Alternatively, component data such as user ID/billing zip code pairs 221 and user ID/IP address pairs 222 are provided wherein the ad network or third-party ad server 230 correlates said data to derive IP address/zip code pairs.

These IP address/zip code pairs are then examined together with the target zip codes of the current ad campaigns to determine the IP addresses for which one or more ad campaigns are available to run. Processing by the advertising network or third-party server 230 interrogates the database 231 and identifies the known IP addresses for which at least one ad is available to be served based on the corresponding users zip codes. For example, the IP address 254.59.230.14 is identified based on the fact that the first advertiser and second advertiser have targeted the corresponding user's zip code, 91203. Likewise, the IP address 254.59.231.173 is identified based on the fact that the fourth advertiser has targeted the corresponding user's zip code, 91211. Web sites 215-216 are then made aware of those identified IP addresses, thus providing them knowledge of the ad network's or third-party ad server's immediate demand for ad inventory for those potential site visitors. Alternative embodiments include identification of known IP addresses associated with additional, or other, attributes of corresponding users sought by the advertisers.

In one or more embodiments of the invention, awareness is achieved by transmitting identified IP addresses, or transmitting changes to the set of those IP addresses, to the web sites. In other embodiments of the invention, the web sites request confirmation as to whether the IP addresses of individual site visitors are among those of interest to the acquiring entity. Also, in some embodiments of the invention, one or more numerical values are provided with each IP address or confirmation indicating the compensation to be provided to the web site for ad inventory of specified formats contributed for that IP address.

Figure 3:
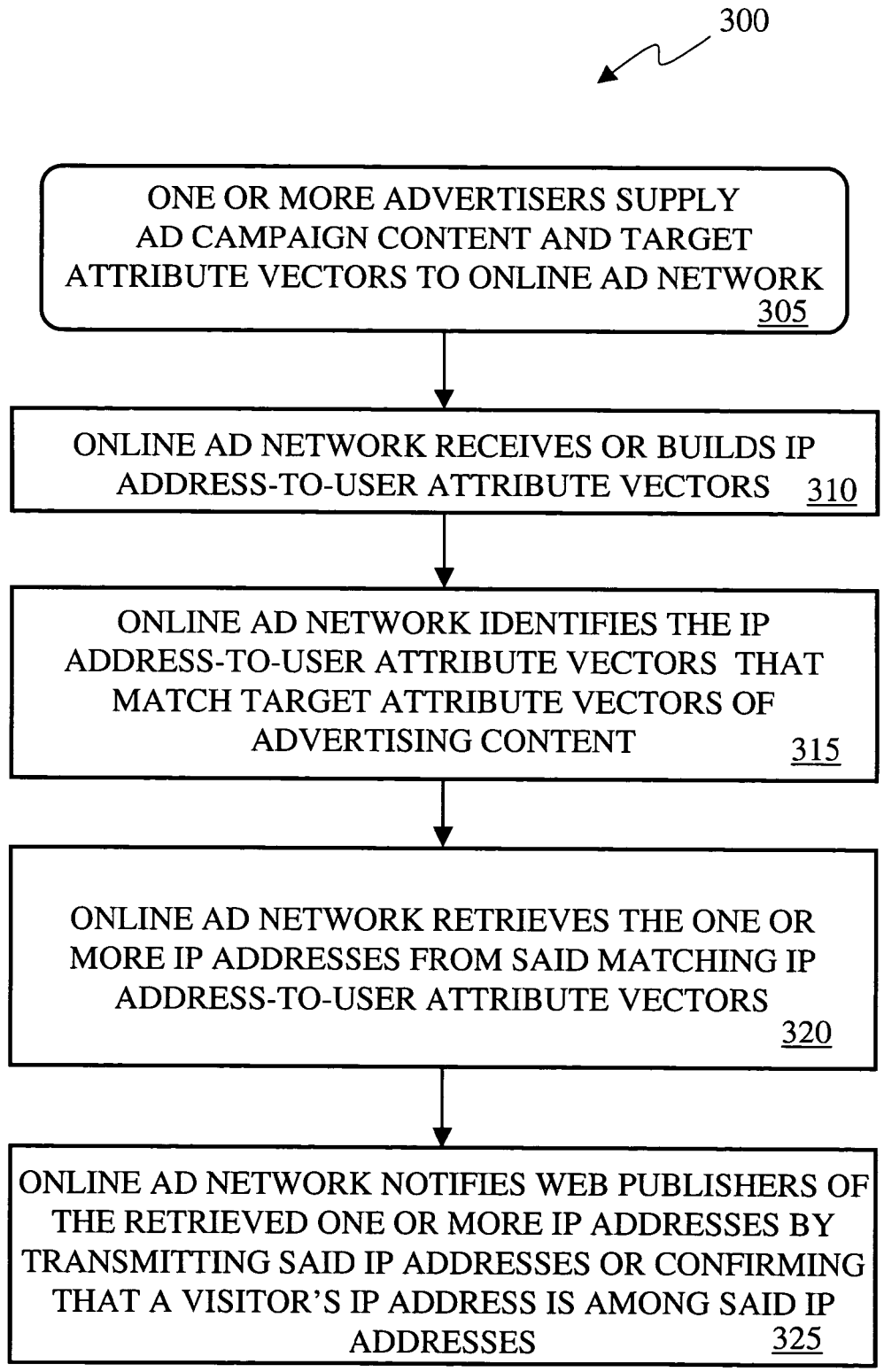
FIG. 3 illustrates a flowchart of the preferred embodiment of the present invention.

In an example embodiment 300 as illustrated in FIG. 3, one or more advertisers supply ad campaign content and target attribute vectors to an online ad network provider 305. In this method 300, the user attribute is preferably a vector that includes at least zip code and may include other attributes available to the ISP or made available to the advertising network or third-party ad server via alternative sources. In the example embodiment illustrated in FIG. 3, one or more IP address-to-user attribute vector pairs are received continually from one or more participating ISPs 310, where the one or more IP address-to-user attribute vector pairs are maintained on a continual basis. A target attribute vector is used 315 to point to and extract the one or more IP addresses currently related to the target vector, if any, so that the extracted IP addresses can be identified to participating web publishers, whether via unsolicited transmission to said publishers or via a web-based query from said web publishers 320. In the present example, one or more IP addresses are determined using a pointer where at least one of the elements of an attribute vector are satisfied. Each of the participating web publishers, in response to the unsolicited transmission of IP addresses or confirmation of a visitor's IP address being among those targeted 325, then includes in at least one web page served to said visitor an ad tag instructing the visitor's browser to fetch an ad from said ad network or third-party ad server. In this example, the browser may be executed on a user's wired or wireless computer or on a web-enabled personal appliance.

Figure 4:
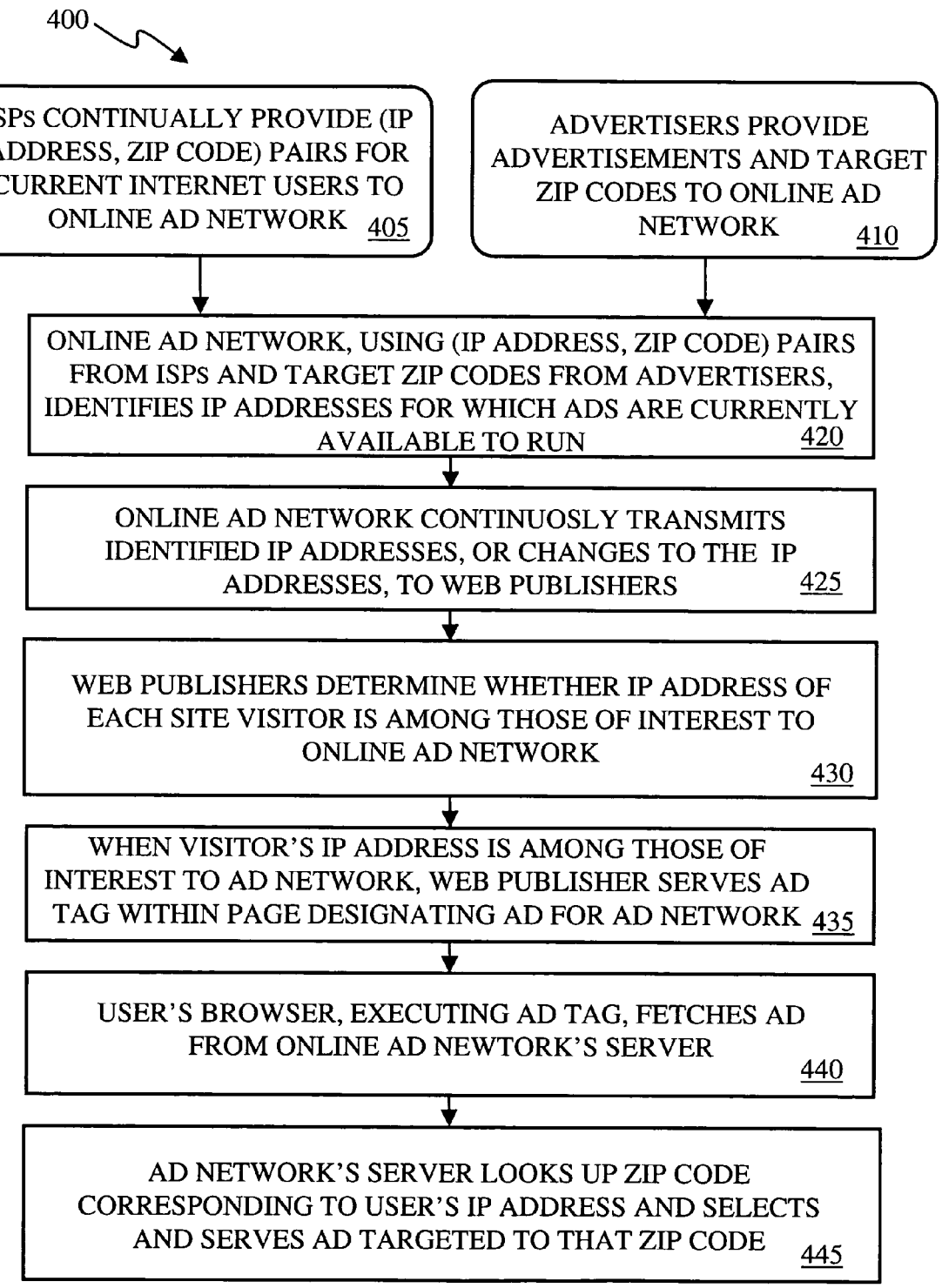
FIG. 4 illustrates a flowchart of an alternative embodiment of the present invention.

FIG. 4 is an example embodiment 400 of the invention in which zip code is the single attribute of an attribute vector. In this example embodiment, continuously-updated IP-address/zip-code pairs for current Internet users are obtained from ISPs 405. Meanwhile, advertisers book locally targeted ad campaigns with the online ad network, specifying the individual zip codes to be targeted 410.

Next, based on the IP-address/zip-code pairs obtained from ISPs and the target zip codes of current ad campaigns, the IP addresses of current Internet users for whom local ads are currently available to run are identified 420. Preferably, those IP addresses are transmitted to servers residing with the web sites 425 and continuously updated. In other embodiments, the web sites request confirmation, from a remote server for example, as to whether the IP addresses of individual site visitors are among those of interest to the ad network 430. Some alternative embodiments have a combination of awareness-inducing transmissions and website confirmation requests or queries.

When an Internet user visits the web site, the web publisher determines whether ad inventory is required by the online ad network for that visitor based on whether the IP address of that visitor is among those indicated to be of interest by the ad network 430. When such demand exists, the web publisher supplies ad inventory to the ad network by including the appropriate ad tag in the web page served to the visitor 435.

Next, the Internet user's browser, acting on the ad tag, fetches 440 an ad from the appropriate ad network server. When the server receives this request, it selects an appropriate local ad for that user based on the known zip code of the user currently associated with that IP address. The ad is then served 445 and the user sees the local ad appropriately displayed within the content of the publisher's web page.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

What is claimed is:

1. A method of targeting Internet advertising to one or more users operatively connected to the Internet via at least one Internet Service Provider wherein each of the one or more users has a browser adapted to visit a web publisher, the method comprising the steps of:
    (a) receiving, from the at least one Internet Service Provider, for each of the one or more users: (i) a user Internet Protocol address and (ii) a user attribute vector;
    (b) receiving, from the browser of at least one visitor of the one or more users, to a web publisher's site, an advertisement request;
    (c) determining an attribute vector of a first visitor, of the at least one visitor, by comparing for a match of the Internet Protocol address of the first visitor and each of the Internet Protocol addresses of the one or more users;
    (d) generating an advertisement targeting one or more attributes of the first visitor, wherein the generating step comprises comparing a targeting attribute of at least one current advertising campaign to a first attribute of one or more attributes of the first visitor for a match; and
    (e) transmitting said advertisement to the first visitor.

2. The method of claim 1 wherein the step of receiving, from the at least one Internet Service Provider, is repeated as each received user attribute vector is updated.

3. The method of claim 1 wherein the step of receiving, from the at least one Internet Service Provider, is repeated as each received Internet Protocol address is assigned to a new user by the Internet Service Provider.

4. The method of claim 1 wherein the user attribute vector associated with each of the one or more users comprises a user zip code.

5. The method of claim 1 wherein the step of generating the advertisement further comprises selecting an advertisement from among existing advertisement content.

6. The method of claim 1 wherein the step of generating the advertisement further comprises customizing existing advertisement content.

7. The method of claim 1 wherein the step of generating the advertisement further comprises creating advertisement content.

8. The method of claim 1 wherein the step of generating the advertisement uses the user attribute vector in combination with secondary data wherein the secondary data is provided in a request via the browser.

9. The method of claim 8 wherein the secondary data comprises at least a portion of a search query entered by the first visitor.

10. The method of claim 8 wherein the generated advertisement appears on a web page having content and the secondary data comprises a classification of the content of the web page for which the advertisement is generated.

11. The method of claim 1 wherein the advertisement is a display ad.

12. The method of claim 1 wherein the advertisement is a paid search result.

13. The method of claim 1 wherein the advertisement is a text link.

14. The method of claim 1 wherein the browser is executed by a personal computer.

15. The method of claim 1 wherein the browser is executed by a web-enabled personal mobile appliance.

16. A method for selectively procuring online advertising space from a web publisher hosting at least one web page contemporaneously requested by at least one Internet user, the method comprising the steps of:
  (a) identifying a plurality of attributes of the at least one Internet user comprising an Internet Protocol address and a first attribute;
  (b) comparing a targeting attribute of at least one current advertising campaign to the first attribute of the plurality of attributes of the at least one Internet user for a match;
  (c) retrieving the Internet Protocol address of each of the at least one Internet user having a matched first attribute; and
  (d) notifying, by a procuring system, the web publisher of the retrieved Internet Protocol address of each of the at least one Internet user having a matched first attribute, wherein the web publisher includes an ad tag for the procuring system in at least one web page served to the at least one Internet user having a matched first attribute.

17. The method of claim 16 wherein the procuring system is an online advertising network.

18. The method of claim 16 wherein the procuring system is a third-party ad server.

19. The method of claim 16 wherein at least one of the plurality of attributes of each of the at least one Internet user is updatable wherein updates to the at least one of the plurality of attributes are provided by one or more Internet Service Providers.

20. The method of claim 16 wherein one or more numerical values are associated with the retrieved Internet Protocol address of each of the at least one Internet user having a matched first attribute, thereby indicating to the web publisher a compensation amount offered to the web publisher for providing ad inventory of a specified format for the retrieved Internet Protocol address of each of the at least one Internet user having a matched first attribute.

21. The method of claim 16 wherein the step of notifying comprises transmitting the retrieved Internet Protocol address of each of the at least one Internet user having a matched first attribute to the web publisher.

22. The method of claim 16 wherein a confirmation request is a web publisher-provided Internet Protocol address and wherein the method further comprises the step of receiving at least one confirmation request as to whether the provided Internet Protocol address is a retrieved Internet Protocol address and wherein the step of notifying comprises responding to the at least one confirmation request.

23. In a distributed network comprising at least one web publisher supplying advertising inventory and one or more users operatively connected to the Internet via an Internet Service Provider wherein each of the one or more users has a browser adapted to visit a web publisher, the method comprising the steps of:
  providing at least one processor executing the steps of:
    receiving, from one or more Internet Service Providers, one or more Internet Protocol address-to-user attribute vectors, wherein each vector comprises an Internet Protocol address associated with a user and one or more user attributes;
    receiving, from one or more advertisers, advertisement content targeting one or more user attributes;
    determining the one or more users to receive said advertisement content by comparing for a match of at least one targeted attribute with at least one user attribute of the one or more Internet Protocol address-to-user attribute vectors received from one or more Internet Service Providers; and
    notifying the at least one web publisher of the one or more Internet Protocol addresses associated with each of the one or more Internet Protocol address-to-user attribute vectors having at least one user attribute matched with the at least one targeted attribute.

24. The method of claim 23 further comprising the step of responding to one or more queries of the at least one web publisher as to whether the one or more Internet Protocol addresses associated with each of the one or more Internet Protocol address-to-user attribute vectors, having at least one attribute matched with the at least one targeted attribute, matches an Internet Protocol address of one or more users visiting the at least one web publisher.

25. The method of claim 23 wherein the one or more user attributes comprises a zip code.

* * * * *